United States Patent Office 3,745,020
Patented July 10, 1973

3,745,020
PROCESS FOR PREPARING CITRUS PUREE
Bruce J. Lime and Robert R. Cruse, Weslaco, Tex., assignors to the United States of America as represented by the Secretary of Agriculture
No Drawing. Filed May 5, 1971, Ser. No. 140,615
Int. Cl. A23l *1/06*
U.S. Cl. 99—100                                              4 Claims

ABSTRACT OF THE DISCLOSURE

Puree has been prepared from the whole orange fruit. This process can be further modified by a de-oiling step to yield a somewhat different orange puree. In the de-oiling process, the whole orange is submitted to an oil gland rupturing step, the oil is then removed with a fine water spray, the blanched orange is coarsely chopped, partially comminuted and unwanted hard portions and seeds removed by screen-type finisher, and finally the desired orange portions comminuted in a homogenizer to a particle size of 0.005 inch or less.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for the preparation of citrus puree. More specifically, it relates to the preparation of a puree utilizing the whole fruit. Still more specifically, it is concerned with the concommitant de-oiling, comminution, of whole oranges in which only the seeds, scaly portions of the peel, and tougher portions of the rag are rejected.

Current utilization of citrus fruit, in the manufacture of single strength juice, and of concentrate for freezing and subsequent reconstitution, is of the order of approximately 55%. Further, much of the edible interior pulp is downgraded wtih seeds, peel and rag in subsequent drying of the pulp wastes for customary use as cattle feed. The necessity of having to dry large quantities of plup containing high percentages of moisture requires considerable process heat and large drying facilities, in order to avoid a more serious waste disposal problem.

Increased utilization of orange fruit has been proposed by Braverman and Levi (Food Technology 14(2): 106–9 [1960]) in a process in which a pressurized vessel is employed to soften the fruit tissues prior to comminution. The fruit are charged to the cooker and placed under a pressure of 50 p.s.i.g. for 3 minutes. The pressure is quickly released and the fruit are expelled and partially broken up. The pulp is further comminuted by known methods. This process requires pressure equipment, as well as being, for practical purposes, a batch, or discontinuous process. Such process are considered undesirable in the U.S. citrus processing industry. Likewise, the use of autoclaves, or other pressure equipment, is avoided whenever possible, for reasons of expense and of safety. This process removes oil by thermal rupture of the oil cells in the flavedo of the fruit; the oil is thus either lost, or is recoverable only as a steam-distilled oil, rather than cold-pressed material having considerably greater economic value.

Haman, in U.S. Pat. No. 2,935,407, produces a citrus whole fruit puree; however, his process either incorporates the seeds and rag into the finished puree, or else an additional separation or coring step is required. Incorporation of seeds and rag into whole fruit puree has been found to impart a bitter and/or a "mealy" texture to the puree, which, when further processed, or utilized, particularly in the preparation of beverages, gives such beverage an off-flavor, as well as an undesirable physical effect in the mouth and lips. Separate removal of the seeds adds costs to the finished product in the form of additional processing time and labor, plus losses of desirable portions of the fruit, particularly if coring is used It is an object of this invention to provide finely comminuted citrus pulp or puree. Another object is to provide a process dispensing with the use of pressurized processing vessels entirely.

Yet another object is to provide a process in which at least a part of the oil present in the flavedo, or outer skin of the fruit, is recovered as cold-pressed oil, instead of steam-distilled oil.

Still another object is to provide a process which will utilize at least 85% of the whole fruit in the final product.

Another object is to provide a truly continuous process in which seeds, scaly portions of peel, and tougher portions of the rag present in citrus fruit may be concommitantly separated as an integral part of the process. We have found that whole citrus fruit can be blanched in boiling water for about from 3 to 20 minutes to soften the tissues; partially comminuted in a screw-type food finisher to separate seeds, and tough portions of peel and rag coincidentally; and further comminuted in an apparatus such as a homogenizer, which will reduce the pulp particles to approximately 0.005 inch diameter or less. Alternatively, the blanched fruit may be coarsely ground in a Fitzpatrick comminuting machine operating at slow speed (about 625 r.p.m.), with a ½ inch screen; further comminuted in a paddle finisher, with 0.060 inch (about 1/16 inch) screen openings, and operating at 1725 r.p.m.; and finally pureed in a homogenizer to reduce the solid pulp particles to 0.005 inch diameter or less. When oil reduction is desired the oil present in the fruit may be removed in one of two ways. 1. The fruit, prior to blanching, may be passed over a tack-studded set of rolls, which ruptures the oil cells in the flavedo, or outer, portion of the peel; the released oil is washed off with a fine spray of water and recovered by centrifuging, or other known methods; or 2, steam-distilled in vacuo, after the final homogenization. The resulting puree is suitable as a base for citrus beverages, glazes, sauces, and other food applications utilizing citrus flavor. The puree lends itself to many applications in the bakery and dairy industries. The puree may be preserved by frozen storage, or by pasteurization and subsequent canning.

The following examples are illustrative of the invention but are not to be construed as limiting it thereby.

EXAMPLE 1

About 40 pounds of oranges were blanched 10 minutes in a steam-jacketed kettle of water previously heated to boiling. Blanching was timed from the time of renewed boiling. The blanched fruit, while still hot, were coarsely cut up and passed through a screw finisher having a conical screen containing 0.062 inch openings, and a central exit for pulp not expressed through the screen. The reject pulp was recycled twice. The final rejected pulp was only 4.3% of the weight of the starting material, and consisted of seeds, tough scaly portions of peel, and thicker portions of rag. The combined pulp passing through the screen was mixed well and passed through a 2-stage laboratory homogenizer. The pulp had a smooth texture and good color. Additional trials using various textured fruit gave yields of 85% to 95%.

EXAMPLE 2

Example 1 was repeated and the homogenized puree was recycled in a vacuum chamber to reduce the oil content to a level of approximately 0.35%. The product temperature was held at 85° F.; the condenser temperatures were between 35° F. to 40° F. and the vacuum was maintained below 29 inches.

EXAMPLE 3

About 40 pounds of oranges were passed over a set of tack-studded rolls. The action of the rolls is such that a spirally-wound riser on each roll, turning in the same direction, lifts and turns the fruit automatically to insure that all oil sacs in the flavedo are uniformly subject to the rupturing action of the tacks. The oil released from the sacs is washed away with a fan-shaped water spray directed against the fruit. The oil is recovered as "cold-pressed" oil by known methods, e.g., desludging and centrifugation. The deoiled fruit were treated as in Example 1. Oil content of the finished puree was under 0.3%. A pulp prepared without this deoiling step contained 0.8% oil.

An excellent citrus beverage can be prepared from the above puree as follows:

|  | Parts by weight |
|---|---|
| Orange pulp | 100 |
| Sugar | 125 |
| Six-fold lemon concentrate | 25 |
| Water to | 1000 |

A beverage prepared by this formula and stored at 70° F. gave highly acceptable ratings by a taste panel over a period of one year. Analysis of this beverage gives the following typical results:

| Brix | dg | 15.1 |
|---|---|---|
| Acid | percent | 0.75 |
| pH |  | 3.0 |
| Suspended solids | percent | 8 |
| Cloud |  | 20.7 |
| "Recoverable" oil | percent | 0.025 |

Synthetic sweetener blends may be substituted for the sugar and U.S.P. citric acid for the lemon concentrate without extensive reformulation.

EXAMPLE 4

About 40 pounds of oranges were treated as in Example 1. Part of the puree was put through a small pasteurizer at 203° F., packed in #303 enamelled cans while still at this temperature. The remainder of the pulp was cold-packed in #303 enamelled cans and stored at −10° F. Excellent keeping qualities were observed.

EXAMPLE 5

About 80 pounds of Hamlin oranges were blanched 10 minutes in two 40-pound batches in a kettle of water at 212° F. The combined, blanched fruit were coarsely chopped in a Fitzpatrick Model D comminuting machine, fitted with a ½" screen and set to operate at about 625 r.p.m. At this speed the fruit are rapidly chopped, without attendant damage to the seed. The coarse ground pulp was further comminuted in a laboratory paddle finisher, fitted with 0.060" screens, and set to operate at 1725 r.p.m. The seeds, scaly portion of peel and tougher portions of rag were rejected simultaneously with the continued comminution, the rejected seeds were largely whole and showed essentially no breaking. No seed particles could be detected in the finely comminuted pulp. The pulp was homogenized in a 2-stage laboratory homogenizer; first stage setting, 1000–1500 p.s.i.g.; second stage setting, 3000 p.s.i.g. The yield of puree was 87.5% of the weight of the starting material. The puree was pasteurized at 190°–203° F. and hot-packed. Drinks prepared from this puree as in Example 3 had very good flavor characteristics.

EXAMPLE 6

A set of wooden rolls about 4" diameter by 24" long was covered with a sheet of 1/16" red rubber sheeting in which ¼" Monel tacks were mounted on ¼" centers, and cemented in place with waterproof adhesive. A piece of ¼" I.D. black rubber tubing was mounted above the rubber sheeting in a spiral, right hand rotation on 1 roll and left hand on the other. The rolls were connected to a gear-drive motor, which caused rotation of both rolls in the same direction. The spirally wound tubing caused the fruit to rotate such that all surfaces of the fruit were subject to the lacerating action of the tacks. By adjusting the angle of inclination of the apparatus, the residence time of the fruit being processed can be varied. Oil released from the ruptured oil sacs was removed with a fine spray of water. Movement of the fruit through the apparatus was by displacement, i.e., when fresh fruit was added at the top, lacerated fruit was pushed off at the bottom and conveyed to an area of further processing.

About 80 pounds of Valencia oranges were passed through the deoiling rolls, and the lacerated fruit processed further as in Example 5. The yield of puree was 85% of the weight of the starting material, and the oil content of the puree was at a level satisfactory for preparing beverages.

EXAMPLE 7

A sample of 30 Valencia oranges was finely ground, including the peel. The pulp showed an oil content of 0.84%.

A second sample of 30 oranges, from the same lot as above, was blanched 10 minutes in a kettle of boiling water prior to grinding. The oil assayed 0.58%.

A third sample of 30 oranges, again from the same lot of fruit, was passed over the tack-studded rolls described above. The oil released was continuously removed concurrently with a fine fan-shaped water spray so arranged that all fruit being lacerated were continuously washed. Residence time on the rolls was approximately 2 minutes per fruit. The lacerated fruit were blanched 10 minutes in a kettle of boiling water, and finely ground. The pulp had an oil content of 0.38%.

We claim:

1. A process for preparing a whole-fruit puree from a low oil-containing citrus fruit, comprising:
   (a) blanching a whole, low oil-containing citrus fruit in boiling water for about from 3 to 20 minutes to soften the tissues;
   (b) coarsely chopping the blanched, whole, low oil-containing citrus fruit, without damaging the seeds, to a particle size of about 0.50 inch in diameter to form a coarsely-ground pulp;
   (c) further comminuting the coarsely-ground pulp, without damaging the seeds, to a particle size of about 0.06 inch in diameter, and simultaneously separating the resulting pulp from the seeds, scaly portion of peel, and tougher portions of rag; and
   (d) homogenizing the separated pulp from step (c) to a particle size of about .005 inch in diameter to obtain a puree in a yield of at least about 85% of the weight of the starting fruit.

2. The process of claim 1 wherein the low oil-containing citrus fruit is a Hamlin orange.

3. A process for preparing a substantially deoiled, whole-fruit puree from a high oil-containing citrus fruit, comprising:
   (a) mechanically puncturing the oil cells in the flavedo of the peel of a high oil-containing, whole citrus fruit to release the oil;
   (b) washing off the thus-released oil with a water spray, collecting the resulting oil-water mixture, and subsequently recovering the oil from the mixture as "cold-pressed oil";
   (c) blanching the resulting partially-deoiled citrus fruit in boiling water for about from 3 to 20 minutes to soften the tissues and further deoil the fruit;
   (d) coarsely chopping the blanched, partially-deoiled citrus fruit, without damaging the seeds, to a particle size of about 0.50 inch in diameter to form a coarsely-ground pulp;

(e) further comminuting the coarsely-ground pulp, without damaging the seeds, to a particle size of about 0.06 inch in diameter, and simultaneously separating the resulting pulp from the seeds, scaly portion of peel, and tougher portions of rag; and (f) homogenizing the separated pulp from step (e) to a particle size of about .005 inch in diameter to obtain a puree having an oil content of below about 0.3% and in a yield of at least about 85% of the weight of the starting fruit.

4. The process of claim 3 wherein the high oil-containing citrus fruit is a Valencia orange.

References Cited
UNITED STATES PATENTS

| | | | |
|---|---|---|---|
| 3,031,307 | 4/1962 | Blakemore | 99—103 |
| 3,037,975 | 6/1962 | Cohn | 99—105 |
| 2,283,290 | 5/1942 | Savage | 99—103 |
| 2,752,253 | 6/1956 | Talburt | 99—103 |
| 2,289,851 | 7/1942 | Moxay | 99—103 |
| 2,935,407 | 5/1960 | Haman | 99—100 |

OTHER REFERENCES

Proceedings of the 1968 Conference on Citrus Chemistry ARS 72–73, May 1969, p. 17.

NORMAN YUDKOFF, Primary Examiner

U.S. Cl. X.R.

99—103, 105